Sept. 18, 1962  L. A. CARRIOL  3,054,531
LIQUID DISPENSING MECHANISM
Filed April 24, 1959  9 Sheets-Sheet 1

INVENTOR
LOUIS A. CARRIOL
BY
ATTORNEYS

Sept. 18, 1962 L. A. CARRIOL 3,054,531
LIQUID DISPENSING MECHANISM
Filed April 24, 1959 9 Sheets-Sheet 2

INVENTOR
LOUIS A. CARRIOL
BY
ATTORNEYS

Sept. 18, 1962 L. A. CARRIOL 3,054,531
LIQUID DISPENSING MECHANISM
Filed April 24, 1959 9 Sheets-Sheet 3

Sept. 18, 1962 L. A. CARRIOL 3,054,531
LIQUID DISPENSING MECHANISM
Filed April 24, 1959 9 Sheets-Sheet 6

INVENTOR.
LOUIS A. CARRIOL
BY
ATTORNEYS

Sept. 18, 1962 L. A. CARRIOL 3,054,531
LIQUID DISPENSING MECHANISM
Filed April 24, 1959 9 Sheets-Sheet 7

INVENTOR.
LOUIS A. CARRIOL
BY
ATTORNEYS

INVENTOR.
LOUIS A. CARRIOL

ATTORNEYS

INVENTOR.
LOUIS A. CARRIOL
BY Pennie, Edmonds, Morton,
Barrows & Taylor
ATTORNEYS

United States Patent Office 3,054,531
Patented Sept. 18, 1962

3,054,531
LIQUID DISPENSING MECHANISM
Louis A. Carriol, Aulnay-sous-Bois, France, assignor to Societe d'Etudes d'Inventions et de Brevets-S.E.I.B., Paris, France
Filed Apr. 24, 1959, Ser. No. 808,737
Claims priority, application France Apr. 25, 1958
17 Claims. (Cl. 222—33)

The present invention relates to mechanisms for dispensing liquids, such as gasoline, for example, and more particularly to improvements in respect of indicating mechanisms used in connection with gasoline dispensing apparatus and the like to indicate the volume and price of liquid delivered.

In conventional gasoline dispensing installations, for example, it is common to provide indicators observable from opposite sides of a housing, to enable an attendant or purchaser to determine at a glance the volume of liquid delivered and the total price thereof. Such indicators usually comprise sets of indicator drums arranged in pairs on opposite sides of the housing, one set of drums of each pair indicating volume while the other set of drums indicates price. Conventionally, the drums are driven by means of a metering device entrained by the flowing liquid. The metering device is connected directly to the volume indicating drums and through a variable transmission to the price indicating drums. The variable transmission is capable of adjustment to accommodate various unit prices of the liquid delivered.

In the past, the incorporation in the dispensing installation of a suitable variable transmission device has added substantial bulk to the installation, due to the volume displaced by the transmission unit. Certain substantial improvements in the design of such units have been made heretofore and form the subject matter of my prior copending application Ser. No. 782,213, filed December 22, 1958, now Patent No. 2,986,951, issued June 6, 1961, for "Gear Mechanism for Fuel Dispensing Apparatus and the Like," of which the present application is a continuation in part. In addition, as one of the specific features of the present invention, an indicating mechanism of an unusually compact nature is provided, in which a novel variable transmission mechanism is housed within the generally rectangular area defined by the four indicating drums, this being accomplished without increasing the separation between the drum axes or reducing the diameter of the drums.

In a typical variable transmission device of the type referred to herein, there is provided a conical stack of gears whose diameters are proportional to the integers one through nine. The gears of the stack may be engaged selectively by a plurality of output pinions, so that the output of any gear may be varied in proportion to the integers one through nine. In all such mechanisms, the minimum size of the smallest diameter gear is a limiting factor and, in a conventional mechanism, the largest gear of the conical stack necessarily is nine times the diameter of the smallest gear. In my beforementioned copending application, there is disclosed an improved mechanism, in which the smallest gear in the stack is proportional to the integer two and the largest gear in the stack is approximately five times as large as the smallest gear, resulting in a substantial savings in displaced volume. Further substantial improvements are effected in accordance with the present invention by constituting the transmission in a novel and improved manner, to the end that the smallest gear of the stack may be proportional to the integer three and the largest gear of the stack need be only about three times the diameter of the smallest gear. Accordingly, the entire mechanism may be of a practical minimum physical size, capable of incorporation in the complete dispensing mechanism in a novel and improved manner, substantially as set forth in my copending application Ser. No. 792,316, filed February 10, 1959, for "Indicating Means for Liquid Dispenser," of which this application constitutes a continuation in part.

In connection with the improved transmission mechanism mentioned above, there is provided a novel arrangement for manipulating a plurality of output pinions into mesh with desired gears of the conical stack. In this respect, to adjust the position of an output pinion, it is necessary to advance the pinion longitudinally and also to move it generally radially toward and away from the axis of the conical stack, to accommodate the changes in diameter of the gears. In accordance with the present invention, a novel cam control means is provided in association with each output pinion to guide the pinion along the conical stack in the desired manner. The cam has an active surface of generally sawtooth form, so that the proper in and out movement of an output pinion is effected as it moves into and out of mesh with successive stepped gears of changing diameter.

Another novel and advantageous feature of the new apparatus resides in the provision of improved arrangements for returning the indicator drums to zero following a delivery operation, to condition the apparatus for a subsequent operation. In this respect, it has been proposed heretofore to provide spring-operated followers acting upon cams carried individually by each drum of an indicator. To reset the indicator to zero, the drums are disconnected from each other and from the input drive, enabling the drums to be returned individually to zero by the force of the followers on the respective cams. Such conventional arrangements present substantial problems, however, in connection with a liquid dispensing unit of the type concerned herein, since four sets of drums are provided, and the restraining force of a large number of followers acting on the cams of individual drums causes such resistance that slippage error is introduced in the metering device entrained by the flowing liquid. In accordance with the present invention, novel arrangements are provided whereby the several drums of an indicator are returned to zero by followers acting individually on the drums, but the total restraining force imparted by the followers is never greater than that of a single follower acting on a single drum. The improved operation is realized by providing for the full displacement of the follower during a partial revolution of the drum and the locking of the follower in such displaced position by independent means during the remainder of the dispensing operation. Thus, in an indicator comprised of a plurality of drums, the several followers are displaced in sequence and the displacement of one is completed before the displacement of the next is initiated.

In conjunction with the improved resetting means, there conveniently may be incorporated improved arrangements for insuring positive return of the drums to zero positions. That is, in the event of sluggish operation, in which the spring force on the followers is insufficient to return the drums to zero, positive mechanical means are brought into operation to complete the return movement. If the apparatus functions properly, the mechanical means simply go through their motion without effect. In either event, it is assured that a subsequent delivery operation cannot be initiated unless the drums are set to zero. In one specific form of the invention, the resetting means operates automatically in response to the removing from a hook of a dispensing nozzle. In other cases, the reset may be effected by a manually operated member.

For a better understanding of the above and other novel and advantageous features of the invention, reference should be made to the following detailed specification and to the accompanying drawings, in which.

Referring now to the drawings, the reference numeral 10 designates generally as indicator mechanism according to the invention, intended for incorporation in a gasoline dispensing installation, for example. The mechanism comprises a pair of spaced frame plates 11, 12 journalling four sets of indicator drums 13, 14 and 13a, 14a. The sets of drums are arranged in pairs, on opposite sides of the frame, and each pair comprises a set of price indicating drums 13 and a set of volume indicating drums 14. The sets of drums are arranged with their axes parallel and defining a generally rectangular area, and the location of the drums is such that, when a housing (not shown) is placed over the mechanism, a set of price and volume indicator drums is visible from each of two sides of the installation. In general, the indicators are of the decade transfer type, although certain improvements have been incorporated therein, as will be described.

Figure 6:
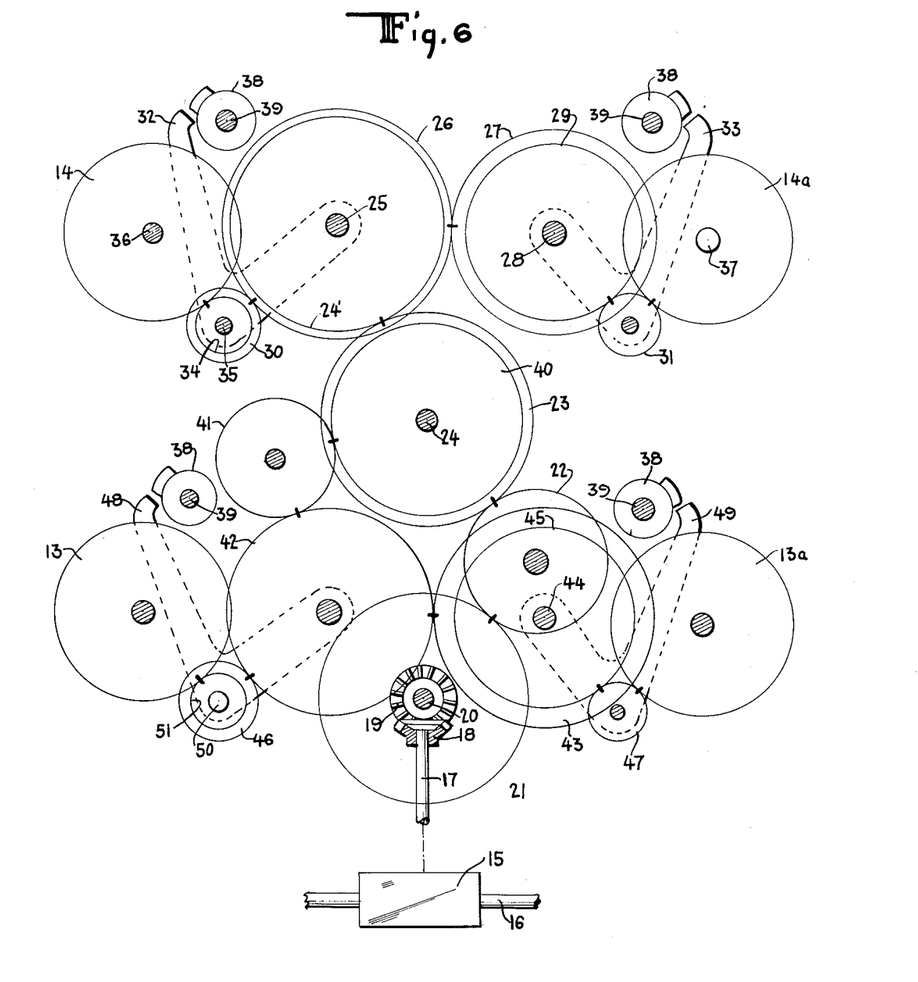
FIG. 6 is a simplified, schematic representation of the drive system incorporated in the new mechanism.

As shown best in FIG. 6, the indicator drums are driven from a liquid meter 15 entrained in a liquid delivery line 16 and arranged to drive a shaft 17. The shaft 17 acts through bevel gears 18, 19 to drive a horizontal shaft 20 mounting a gear 21. The gear 21 drives a gear 22, as indicated by the short line crossing the point of tangency between the gears, and the gear 22 drives a gear 23 journalled on a shaft 24 disposed generally centrally with respect to the indicator drums.

The volume indicator drums 14, 14a are arranged to be driven directly by the liquid meter 15, and this is accomplished by driving a gear 24' by means of the gear 23 and, in turn, driving the volume indicator drums from the gear 24'. Thus, the gear 24' is mounted on a shaft 25 for rotation therewith, and the shaft 25 has fixed thereto a gear 26. The gear 26 drives a gear 27 mounted on a shaft 28 having fixed thereto a gear 29.

The gears 26, 29 drive idler gears 30, 31, respectively, carried by brackets 32, 33. In its operative position, the idler gear 30 drives a second idler gear 34 mounted on a common shaft 35, and the gear 34 drives an input gear connected to the first or units drum of the drum set 14, journalled on a shaft 36. The idler 31 drives an input gear for the drum set 14a supported on a shaft 37. Thus, when the input shaft 17 is driven by the meter 15, the units or lowest order drums of the volume indicators 14, 14a are driven at equal speeds but in opposite directions simultaneously to effect similar indications on opposite sides of the installation.

As will be explained in greater detail, it is desirable periodically to disengage the drum sets 14, 14a from the drive system, to enable the drums to be reset to zero. And, for this purpose, there are provided cams 38 fixed to shafts 39 and arranged to engage the levers 32, 33. Prior to the resetting operation, the cams 38 are rotated to pivot the levers 32, 33 and carry the respective pinions 34, 31 out of engagement with the drum sets 14, 14a.

The drum sets 13, 13a, for indicating the price of a delivered volume of liquid, are driven from the meter 15, but through the intermediary of a variable transmission device, to be described in greater detail. For the purpose of illustration, in FIG. 6, the gear 40, coaxial with the shaft 24, represents the output gear of the variable transmission mechanism, which drives an idler gear 41. The idler 41 drives a gear 42 which, in turn, drives a gear 43 fixed to a shaft 44 carrying yet another gear 45. The gears 42, 45 drive idlers 46, 47, respectively, carried by levers 48, 49 similar to the levers 32, 33. The idler 46 is fixed to a shaft 50 which carries an idler 51 arranged to mesh with a gear fixed to the input or lowest order drum of the price indicator drum set 13. The idler 47 meshes directly with the gear driving the lowest order drum of the price indicator drum set 13a. Accordingly, the price indicator drums 13, 13a will operate in opposite directions and equal speeds in direct accordance with operations of the volume indicating drums 14, 14a but at a rate determined by the setting of the variable transmission device driving the gear 40.

To enable the price indicator drums 13, 13a to be reset to zero, cams 38, mounted on shafts 39, are provided in association with the levers 48, 49 whereby, when the cams 38 are operated, the pinions 51, 47 are carried out of engagement with the drums.

In connection with the foregoing description of the operating system 15–50, and the illustration of FIG. 6, it is not intended that the schematic representation of the gears and pinions reflect the diameters thereof in the proper proportions. Moreover, concentric gears shown to be of different diameters for purposes of clarity may, in fact, be of equal diameters.

As one of the important features of the invention, a novel and improved variable transmission mechanism is provided which is extremely compact and is capable of being installed within the generally rectangular area defined by the sets of indicator drums, without necessitating any reduction in the diameter of the drums or any increase in the spacing of the drum axes. As shown best in FIG. 5, the new transmission mechanism comprises a conical stack of gears 51 fixed to the shaft 24, which is journalled in plates 52, 53. The conical stack 51 consists of a series of gears 54a–54g of increasing diameters and, in accordance with the invention, the respective gear diameters are proportional to the integers three through nine. The smallest gear of the stack, gear 54a, is normally made as small as practicable, taking into consideration such factors as the ability of the gear to mesh satisfactorily with as many as four output pinions, while providing satisfactory operating life, facility of manufacture, etc. In this respect, experience has shown that the diameter of the smallest gear 54a is a relatively limiting factor in that, if the gear is too small, the apparatus does not have a satisfactory operating life in normal day-to-day operations.

Figure 5:
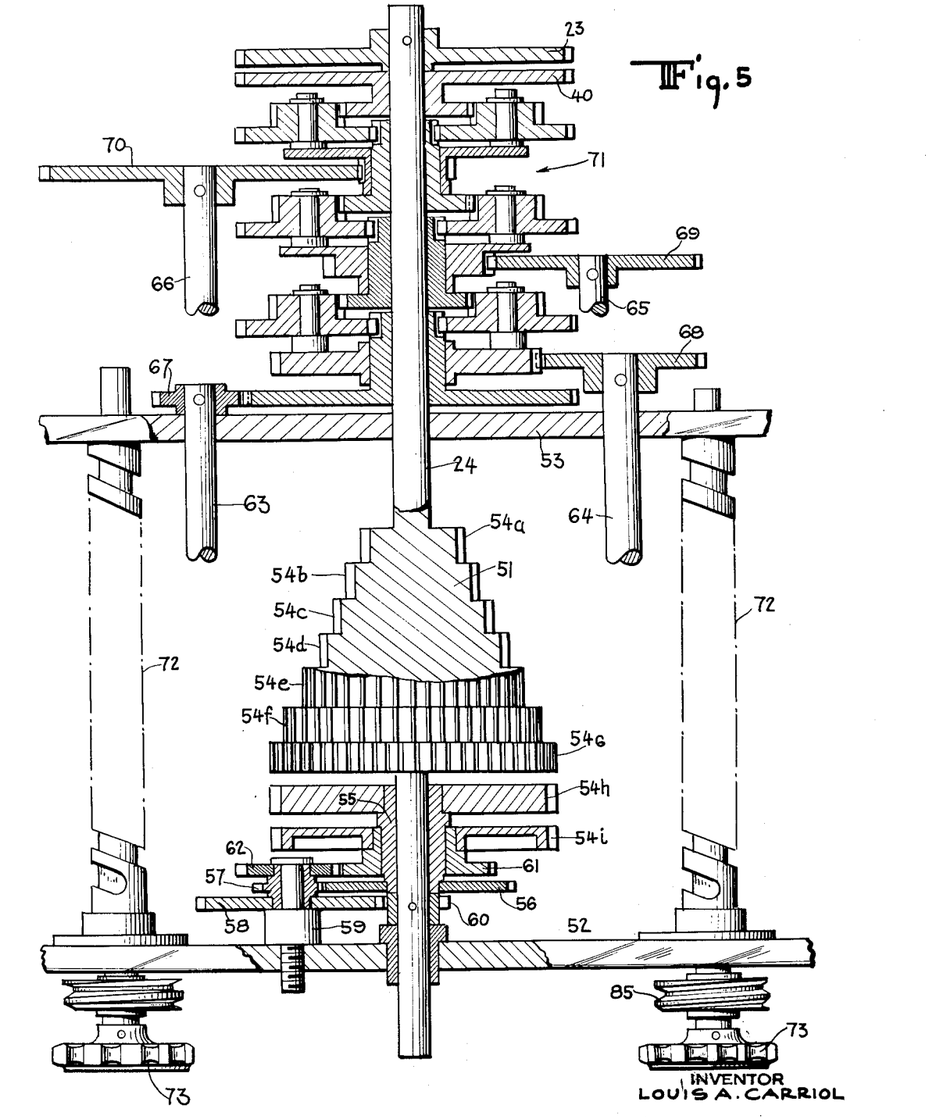
FIG. 5 is a cross-sectional view taken generally along line 5—5 of FIG. 1, showing the improved variable transmission device of the invention.

Mounted adjacent the large end of the stack 51 is a gear 54h fastened to a sleeve 55 which is rotatable on the shaft 24. Advantageously, though not necessarily, the gears 54g and 54h are of equal diameter. The sleeve 55 extends away from the stack 51 and has fixed to its outer end a gear 56 driven by a pinion 57. The pinion 57 is, in turn, fixed to a gear 58 journalled on a stub shaft 59 and driven by a pinion 60 secured to the main shaft 24. In accordance with the invention, the arrangement of gears 56–60 is such that the gear 54h rotates at an effective speed proportional to the integer one, in relation to the gears of the stack. Thus, in effect, the gear 54h replaces a small diameter gear of the stack, whose diameter was one-third that of the gear 54a.

Journalled on the sleeve 55 is a gear 54i, which is fixed to a gear 61 driven by a pinion 62 fixed to the gear 58. The gear 54i is driven in fixed relation to the gear 54h and, in accordance with the invention, the effective speed of the gear 54i is twice that of the gear 54h, or proportional to the integer two.

Thus, in the described gear mechanism, the gears 54a–54i have effective speeds proportional to the integers one through nine. However, the diameter of the largest gear is only three times the diameter of the smallest gear whereas, in conventional mechanisms, the largest gear is nine times the diameter of the limiting, small diameter gear.

As will be described in greater detail, the intermediate output of the gear stack 51 (the term gear stack including the separate but related gears 54h, 54i) comprises four shafts 63–66. These shafts have fixed thereto gears 67–70, respectively, comprising intermediate inputs to a series-connected epicyclic gear train. The arrangement is such that price regulation may be effected to four places, the gear 67 representing an input of the highest order and the gear 70 representing an input of the lowest order. As will be described, the shafts 63–66 are driven by output pinions engaged selectively with gears of the stack 51 in a predetermined order. Thus, if the unit price varies with unit volume in accordance with the four place figure 5311, for example, the drive for the highest order intermediate output is engaged with the gear 54c, whose diameter is proportional to the integer five. The drive for the next highest order shaft is connected to the gear 54a, whose diameter is proportional to the integer three, and the other two shafts are connected to the gear 54h, whose effective speed is proportional to the integer one. The respective outputs are, in effect, integrated by the epicyclic gear train 71, and the output of that train is represented by rotations of the gear 40 journalled on the shaft 24.

Figure 3:
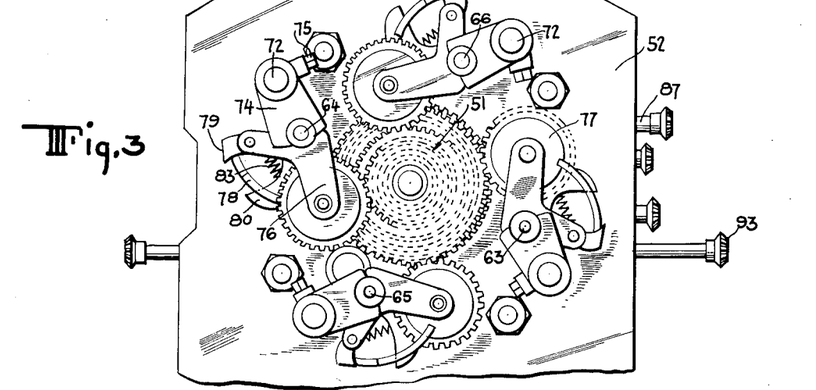
FIG. 3 is a cross-sectional view of the improved variable transmission device incorporated in the mechanism of FIG. 1.

Referring to FIG. 3, in conjunction with FIG. 5, it will be observed that the shafts 63–66, journalled in the plates 52, 53, are spaced uniformly about the gear stack 51 and shaft 24. Adjacent each of the shafts is a threaded control shaft 72, one end of which projects through the plate 52 and has mounted thereon a knob 73 to facilitate manual manipulation. A bracket 74 extends between and is supported by each associated pair of threaded and output shafts, and the bracket has a member 75 engaging the threads of the shaft 72 whereby rotation of the shaft causes the bracket to be advanced longitudinally of the gear stack. Advantageously, the brackets 74 are of U-shaped configuration, having spaced arms extending to the output shafts 63–66.

Mounted on the output shafts 63–66, between the arms of the brackets 74, are levers 76 in the nature of bell cranks. The levers 76 are pivoted on the output shafts and carry at one end output pinions 77. The range of pivoting movement of the levers 76 is such that the output pinions 77 can be swung into engagement with any of the gears of the stack 51, depending upon the longitudinal position of the gears relative to the stack. The output pinions 77 are constantly in mesh with gears (not shown) keyed slidably to the output shafts 63–66, whereby rotations of the output pinions effect corresponding rotations of the output shafts. Thus, when as output pinion 77 is meshed with one of the gears of the stack, rotation of the main shaft 24 will effect rotation of the associated output shaft in proportion to the diameter or effective speed of the particular gear of the stack.

In accordance with one of the specific features of the invention, novel arrangements are provided for controlling the motions of the levers 76 whereby the output pinions 77 are moved into and out of mesh successively with the gears of the stack as the output gears are advanced longitudinally upon rotation of the threaded shafts 72. To this end, there is associated with each of the bell crank levers 76 a cam plate or strip 78, shown in detail in FIG. 7. The cam strip 78 is mounted in fixed relation to the gear stack 51 and is arranged to cooperate with opposed cam followers 79, 80 provided on the levers 76. Advantageously, one side of the cam plate 78 is generally smooth, although contoured in a predetermined manner, while the other side, while following a similar general contour, is generally of saw-tooth form. The arrangement is shown at 81, 82 in FIG. 7. The cam follower 79, cooperating with the saw-tooth surface 82 of the cam, is fixed to the lever 76, while the follower 80, cooperating with the smooth surface 81 of the cam, pivots with respect to the lever 76 but is urged constantly toward the follower 79 by means of a spring 83.

Figure 7:
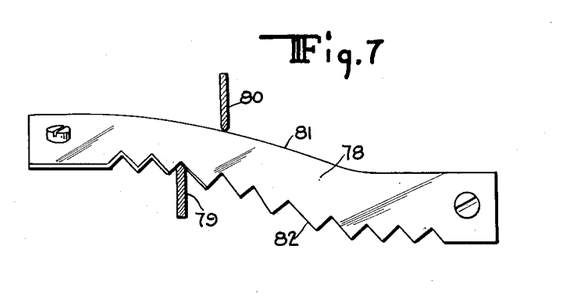
FIG. 7 is an enlarged, fragmentary view of a control cam incorporated in the new variable transmission device.
Figure 8:
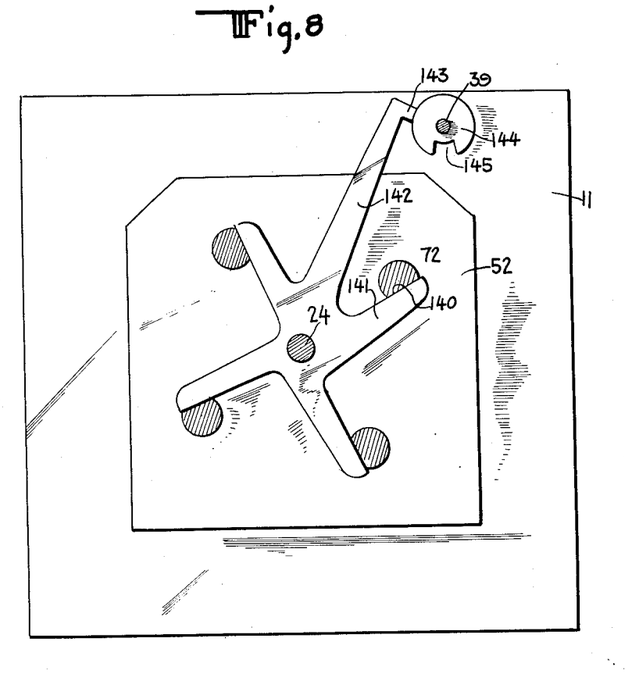
FIG. 8 is a cross-sectional view taken generally along line 8—8 of FIG. 1, illustrating an improved locking means associated with the variable transmission.

As the bracket 74 and lever 76 of an output pinion assembly are advanced longitudinally of the gear stack 51, by manipulation of the threaded shaft 72, a reciprocating pivoting movement of the lever 76 is effected such that, with each reciprocation, the output pinion 77 of the assembly is caused to swing into meshing position with the gear of the stack with which the pinion is aligned. Thus, the general contour of the cam plate 78 corresponds to the general shape of the gear stack 51, including both the tapered and the even-diametered portions thereof, and the saw-tooth surface of the cam effects a desired swinging in and out movement of the lever, so that the pinion is moved radially outward sufficiently to permit longitudinal advancement thereof. Thus, as the output pinion assembly is advanced along the entire series of gears of the stack, the output pinion 77 engages successively the several gears of the stack.

One of the important advantages of the above-described means for controlling the movements of the output pinions 77 is that the cam plate 78 may be contoured to correspond to a gear stack which is conical over one portion and even-diametered over another portion. In contrast, with known arangements, it would be necessary to shape the gears 54h and 54i to have larger diameters, following the general conical envelope of the gear stack. Accordingly, the maximum diameter of the stack would be substantially greater. The new mechanism is also of a generally simplified nature and requires a minimum of space, in keeping with the overall objective of maintaining the physical space requirements of the variable transmission mechanism at a practicable minimum.

Figure 2:
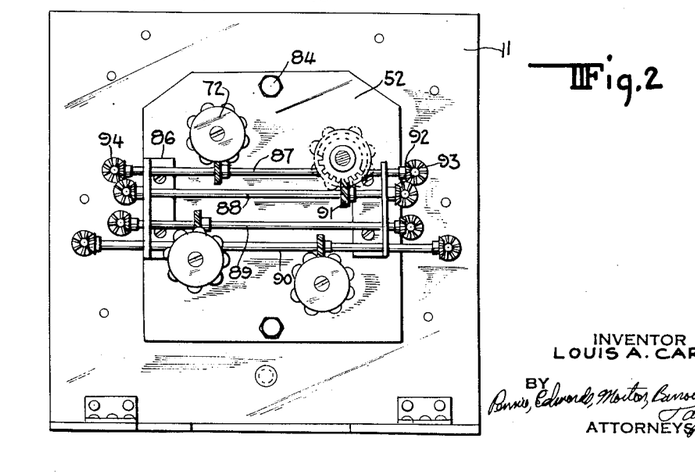
FIG. 2 is one end elevation of the mechanism of FIG. 1.

As set forth in my before-mentioned copending application Ser. No. 792,316, it is desirable and advantageous to construct the entire variable transmission mechanism for lengthwise insertion into the frame mounting the four sets of indicator drums. To this end, the frame plate 11 of the illustrated apparatus is provided with an opening of a size suitable to receive the transmission mechanism, the mechanism being of minimum physical size, as above described, so that it may be received readily in the generally rectangular area defined by the indicator drums. The entire transmission mechanism is supported by a unitary frame, including the plates 52, 53, and the plate 52 is arranged to cover and close off the opening in the plate 11, substantially as illustrated in FIG. 2, when the transmission is assembled in the overall mechanism. Suitable means, such as bolts 84 may be used to secure the plate 52 to the plate 11 and thereby mount the entire variable transmission mechanism in place.

Advantageously, there are provided suitable unit price indicator means associated with the threaded shafts 72 of the variable transmission mechanism, so that it may be ascertained visibly from outside the housing of the mechanism exactly at what unit price the mechanism is set. To this end, each of the shafts 72 has fixed thereto, just inside the manipulating knob 73, a worm gear 85. Mounted on the plate 52, by means of brackets 86, are shafts 87-90, each carrying a worm wheel 91 meshing with one of the worm gears 85 of the shafts 72. In accordance with one of the specific features of the invention, the shafts 87-90 extend beyond the effective edges of the plate 52 and have mounted at their ends bevel gears 92. When the transmission mechanism is in position, the bevel gears 92 mesh with similar bevel gears 93 carried at the ends of shafts 94 journalled in the frame plates 11, 12 at opposite sides of the mechanism. The shafts 94 are operatively engaged with respective unit price indicator drums 95 mounted so as to be at least partially visible from outside the housing of the mechanism. The arrangement is such that, when any of the shafts 72 is manipulated, the unit price indicator drum 95 corresponding thereto is rotated so that, at any time, the number visible on the drum indicates the effective position of the output pinion 77 corresponding to the drum. Advantageously, the lead of the threaded shafts 72 is such that the pinions 77 will be advanced from one gear position to another for each revolution of the shafts 72. In any event, however, each operative position of the pinions 77 is clearly indicated by the detent action of the cam follower 79 moving along the saw-tooth cam surface.

One of the advantageous features of the described arrangement for interconnecting the unit price indicator drums 95 with the adjusting shafts 72 is that the respective elements are disconnected automatically upon removal of the plate 52. Removal of the mechanism is thus substantially simplified, facilitating such periodic maintenance and inspection as may be desirable or expedient.

As one of the important features of the invention, novel and improved arrangements are provided for returning the respective drums of the volume and price indicator mechanisms to zero following a delivery operation. One of the known arrangements for this purpose involves the use of cams carried by the individual drums and cooperating with spring-urged cam followers in such a way that, when the drums of a mechanism are disconnected from each other, the spring-urged followers act on the cams to return the drums individually to zero. While such an arrangement is satisfactory where adequate driving power is available, certain problems arise in connection with a liquid dispensing apparatus of the type concerned herein, where the indicating mechanism is driven by means of a fluid meter. Substantial force is required to displace simultaneously a plurality of spring-urged cam followers (one for each drum, of which there may be several in each of four sets), and a satisfactory solution does not lie in simply reducing the force of the spring, as a certain minimum force is required to return the drums to zero in a reliable manner. In accordance with the invention, spring-urged cam followers acting independently upon each drum of a set are displaced individually, in such manner that, for each set of drums, the total displacement force required is never greater than that required to displace a single follower.

Figure 9:
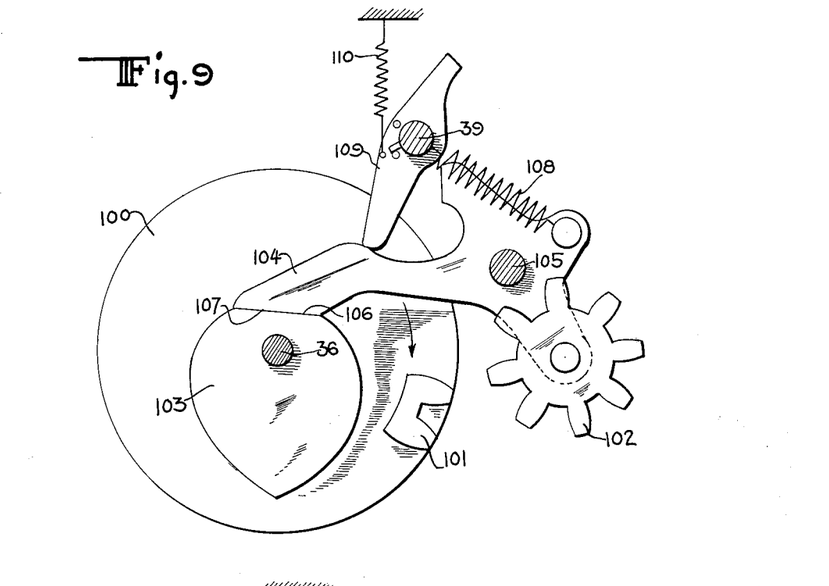
FIGS. 9 and 10 are enlarged, fragmentary views illustrating one form of improved reset means incorporated in the indicating mechanism.
Figure 10:
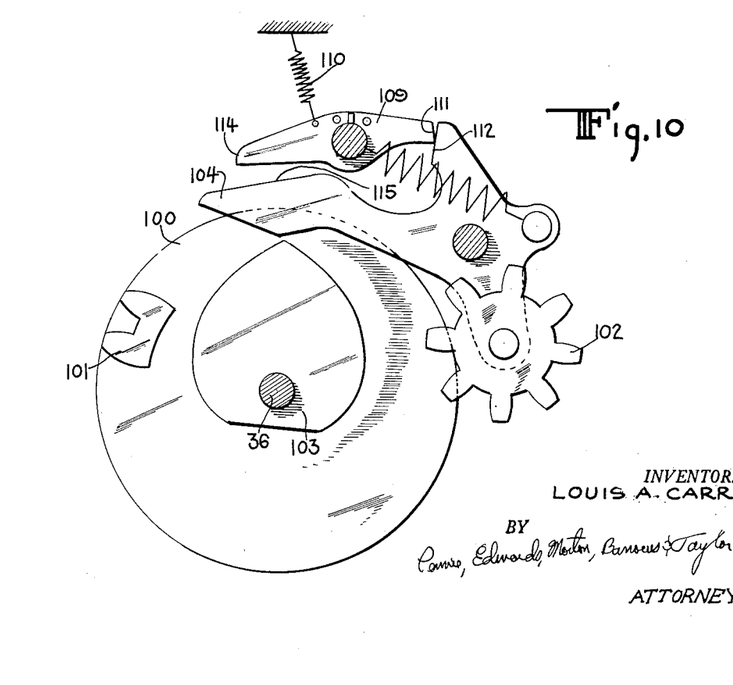

Referring particularly to FIGS. 9 and 10, there is illustrated an indicator drum which, for example, may be the units drum of the volume indicator drum mechanism 14. The drum 100 forms part of an otherwise conventional decade transfer counter mechanism in which, during each revolution of a lower order drum, while that drum is moving from a nine position to a zero position, a cog 101 thereon engages a transfer pinion 102 engaged with the drum of the next higher order. As the lower order drum moves from nine to zero, the drum of the next higher order indexes through one position, say from four to five. During the remaining portion of the revolution of the lower order drum it is disconnected from the drum of the next higher order.

In accordance with the invention, each of the drums of a set, of which the drum 100 is representative, is mounted for free rotation on shaft 36 and has fixed thereto a cam 103, advantageously of generally heart-shaped contour. In the illustrated arrangement, the cam 103 cooperates with a cam follower 104 mounted for pivoting movement about a shaft 105. The area of the cam 103 closest to the shaft 36 is provided with a relatively wide, flat surface 106 adapted to cooperate with a flat surface 107 on the follower. When the flat surfaces 106, 107 are together, as shown in FIG. 9, the drum 100 is in its zero position; that is, the zero digit on the drum is visible through the window of the housing.

As indicated in FIG. 9, the follower 104 is urged to pivot in a counterclockwise direction by a spring 108. Accordingly, when the drum rotates from its zero position, the cam 103 displaces the follower 104 in a clockwise direction against the action of the spring 108. And, when the drum 100 is released and permitted to rotate freely on the shaft 36, the pressure of the follower on the cam 103 tends to return the drum to its zero position.

Advantageously, the follower 104 carries at one end the transfer pinion 102, the arrangement being such that the pinion 102 is swung out to an inoperative position, except when the follower 104 is displaced clockwise to its maximum position.

To initiate operation of the indicator, it is necessary first to rotate the shaft 39, which has fixed thereon a locking pawl 109. When the pawl is freed from the position shown in FIG. 9, a spring 110 acts thereon, tending to rotate the pawl clockwise. Clockwise rotation of the drum 100 will then progressively displace the follower 104, causing it to pivot clockwise about the shaft 105. When the drum reaches its five position, as indicated in FIG. 10, the heart-shaped cam has displaced the follower 104 to a maximum extent. At this time, the spring 110 acts on the pawl 109 to urge a locking surface 111 thereof into contact with an abutment surface 112 on the follower. The surface 112 forms, in effect, an inclined plane of narrow angle so that, under the urging of the spring 110, the pawl 109 moves clockwise to a limit position, simultaneously rotating the follower 104 a slight amount in a clockwise direction, clear of the cam 103, and locking the follower in its fully displaced position. Thereafter, there will be no contact between the cam 103 and follower 104 during subsequent revolutions of the drum 100.

Simultaneously with the moving of the follower 104 to its fully displaced position, the transfer pinion 102 is swung into operative position, as indicated in FIG. 10. This occurs while the drum is moving from its zero to its five position, during which period the transfer pinion is normally inoperative. Upon further rotation of the drum 100, the cog 101 will engage the pinion 102 to effect an incremental rotation of the drum of the next higher order.

As will be understood, full displacement and locking of the cam follower 104 takes place in the first half revolution of the drum 100, prior to its first engagement with, and incremental movement of, the drum of the next higher order. This same condition exists throughout the entire series of drums of ascending order, so that the maximum force exerted by the driving mechanism in displacing the followers of a drum set never exceeds the force required to displace a single follower.

In order to reset the drums to zero, the shaft 39 is rotated in a counterclockwise direction, as observed in FIGS. 9 and 10. It will be recalled that the shaft 39 carries a cam 38 (FIG. 6) which, when rotated counterclockwise, engages the lever 32 and moves the pinion 34 out of mesh with the input gear for the lowest order drum. Accordingly, the lowest order drum is conditioned to rotate freely on the shaft 36. Simultaneously, the pawl 109, carried by the shaft 39, is rotated counterclockwise to clear the surfaces 111 and 112, permitting counterclockwise rotation of the follower 104 under the action of the spring 108. The follower is thereby caused to act upon the cam 103, returning the drum either forward or backward to its zero position, as illustrated in FIG. 9. Similar action, of course, takes place throughout the whose series of drums of a set. And, in the event that, at the time reset is initiated, one or more of the drums is locked to an adjacent drum through a transfer pinion, return movement of the lower order drum toward its zero position immediately disengages the transfer pinion by causing it to swing outwardly with pivoting movement of the cam follower. Accordingly, each of the several drums of a set is returned independently to its zero position.

Figure 11:
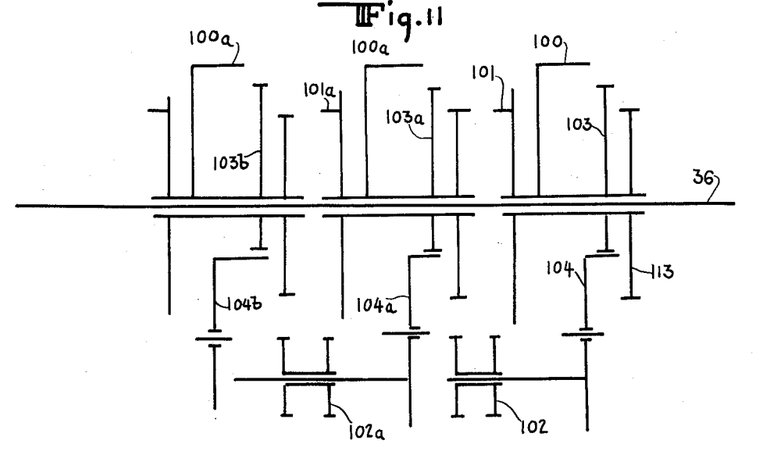
FIG. 11 is a simplified, schematic representation illustrating the operation of the new reset means.

The described reset mechanism is shown in very schematic form in FIG. 11, where the reference numeral 113 designates the input gear affixed to the lowest order drum 100, the gear 36 being the gear which would be driven by the pinion 34 of the FIG. 6 representation. The reference numerals carrying the subscripts "a" and "b" correspond to the elements of the same principal number referred to in connection with FIGS. 9 and 10.

Advantageously, complete reliance is not placed in the springs 108 to return the indicator drums to their zero positions on all occasions, as it is recognized that, under normal operating conditions, the operation of the mechanism may become sluggish, through wear, lack of lubrication, low temperatures, etc. Accordingly, cooperating surfaces 114, 115 are provided on the pawl and follower, respectively, such that the surface 115 forms an inclined plane along which the pawl surface 114 moves as the pawl is rotated counterclockwise to the position shown in FIG. 9. Upon forcible counterclockwise rotation of the pawl 109, the surface 114 will engage the surface 115 and urge the follower 104 to its drum zeroing position. Of course, if the drum returns to zero under the force of the spring 108, the pawl 109 merely moves through its path without effect. In any event, it is convenient and advantageous to utilize the pawl 109 as a safety device, preventing actuation of the liquid delivery apparatus in the event the pawl 109 and shaft 39 have not rotated to the position indicated in FIG. 9, indicating full return to zero of all of the indicator drums.

Figure 1:
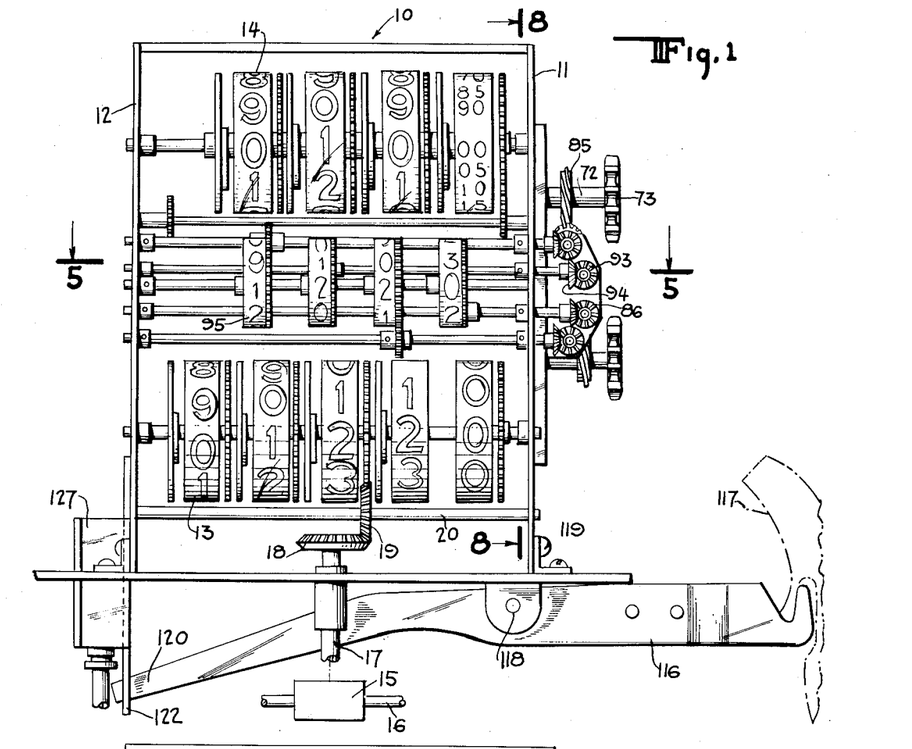
FIG. 1 is an elevational view of an indicating mechanism incorporating improved features of the invention.
Figure 4:
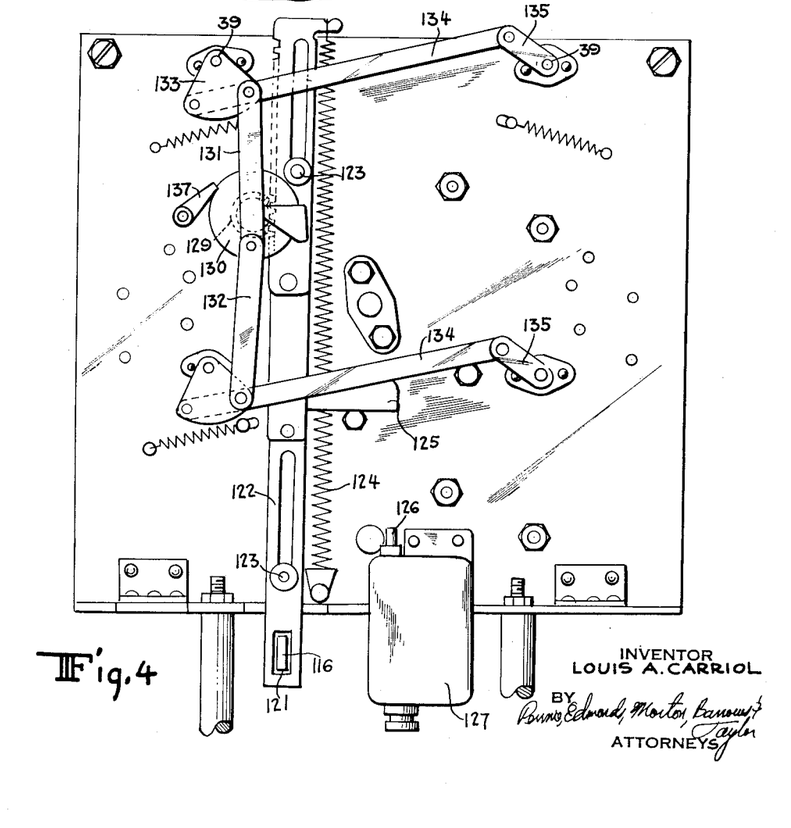
FIG. 4 is a second end elevation of the apparatus of FIG. 1.

In the first-illustrated form of the invention, operation of the shaft 39 of each drum set is effected automatically by removal and replacement on a lever 116 of a dispensing nozzle 117 (FIG. 1). The lever 116 is pivoted at 118 on the base 119 of the mechanism and has an arm 120 projected through an opening 121 in a slide bar 122. The slide bar 122 (see FIGS. 1 and 4) is mounted for vertical movement on the frame plate 12, by means of bolts 123 received in vertically elongated slots in the bar, and the bar is urged downward by a spring 124. Advantageously, the slide bar 122 carries an abutment member 125 adapted, when the slide bar is in a fully lowered position, to engage the actuator 126 of a switch 127. When actuated, the switch 127 conditions the entire apparatus for delivery, as by energizing or permitting the energization of a pump. As will be apparent in FIG. 1, the weight of the nozzle 117 on the lever 116 tends to pivot the lever clockwise to raise the slide bar and deactuate the switch 127. When the nozzle is removed, in preparation for a dispensing operation, the lever is freed to pivot in a counterclockwise direction, under the force of the spring 124 urging the slide bar 122 downward.

Advantageously, the upper portion of the slide bar constitutes a rack 128 meshing with a gear 129 fixed to a crank 130 journalled on the frame plate 12. The crank 130 has connected thereto links 131, 132 attached to rocker plates 133 fixed to the shafts 39 at the left hand side of the apparatus, as viewed in FIG. 4. Links 134 connect the rocker plates 133 with cranks 135 fixed to the shafts 39 at the right hand side of the apparatus. Accordingly, upon downward movement of the slide bar 122, in response to removal of the nozzle 117, the crank 130 is rotated through one complete revolution, rocking the shafts 39 from a position as shown in FIG. 10 to a position as shown in FIG. 9 and then back. This effects release of the cam followers 104 and return of the drums 100 to zero positions, forcibly, if necessary, under the action of the strong spring 124. If, for any reason, any drum fails to return to zero, the pawl 109 associated therewith is prevented from moving to its limit position, as shown in FIG. 9. This prevents the crank 130 from completing even a half revolution and thereby prevents the slide bar 122 from moving downwardly to the extent necessary to engage the plunger 126 and actuate the switch 127.

If all of the drums return to zero in the proper manner, the crank 130 completes a revolution, returning the shafts 39 to their initial positions. This causes the pawls 109 to be rotated clockwise toward the position shown in FIG. 10.

As will be understood, there is sufficient lost motion provided in the connection between the pawls 109 and control shafts 39 to accommodate the necessary movements of the pawls into the locking positions, as shown in FIG. 10, during operation of the indicating mechanism, in the absence of rotation of the control shafts.

At the completion of a delivery operation, the volume and price indicators will indicate the total volume and price of the quantity just delivered. Normally, it is desirable to maintain the indication on the drums until just prior to the next delivery operation. Accordingly, a pawl 137 advantageously is associated with the crank wheel 130, to prevent counterclockwise rotation thereof, and suitable ratchet means (not specifically illustrated) are provided to accommodate upward movement of the slide bar 122 in the absence of rotation of the crank 130.

The apparatus of FIGS. 1–11 incorporates a novel arrangement for locking the setting of the unit price adjustment means during operation of the apparatus and, to this end, the several threaded control shafts 72 are provided with flats 140 adapted to cooperate with flat surfaces of radial arms 141 of a locking lever 142 pivoted on the main shaft 24. The upper end of the lever has a follower portion 143 arranged to cooperate with a locking cam 144, the cam 144 advantageously having a generally circular surface provided at one point with a notch 145. In order to effect rotation of the control shafts 72, it is necessary first to rotate the shaft 39 and locking cam 144 to a position in which the notch 145 registers with the follower portion 143 of the locking lever. By way of example, proper orientation of the cam 144 may be achieved when the slide bar 122 is moved approximately half-way downward through its normal operating stroke. In such case, adjustment may be effected by holding the lever 116 about half-way between its upper and lower positions while manipulating the control shafts. Proper incremental adjustment of the shafts 72 is assured, prior to the initiation of a delivery operation, since the orientation of the flat surfaces 140 and the arms 141 must be proper in order to effect disengagement of the locking cam 144 and follower portion 143.

Figure 13:
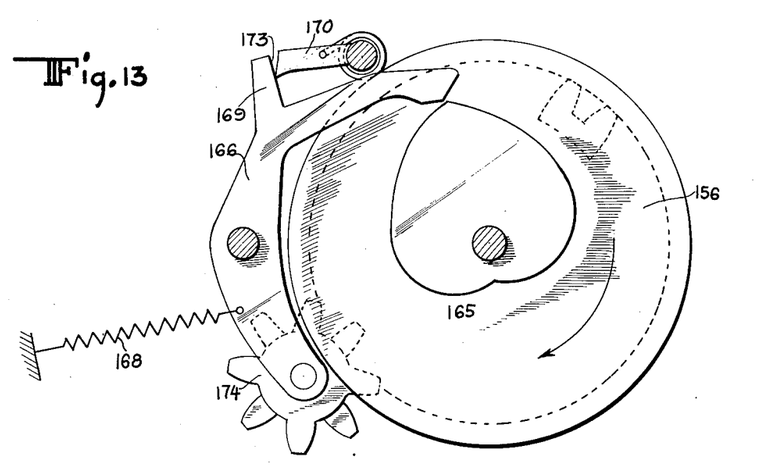
Figure 14:
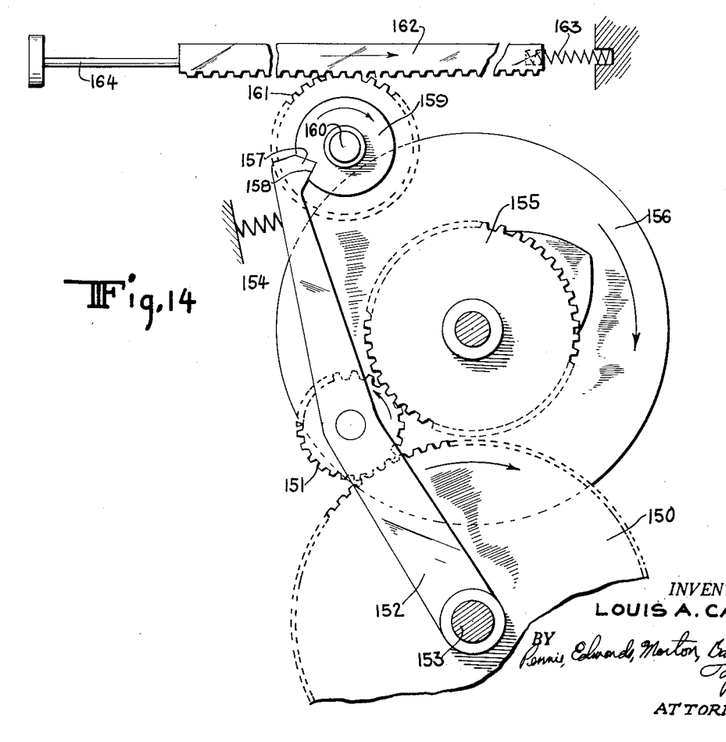

In FIGS. 13 and 14, there is shown a modified form of zero resetting mechanism which, among other things, is adapted for manual reset. Thus, in FIG. 14, the numeral 150 designates a drive gear driven by the fuel meter and meshing with an idler pinion 151 journalled by a lever 152 pivoted on the shaft 153 of the drive gear 150. Means, such as a spring 154, urges the lever 152 clockwise, normally causing the idler pinion 151 to mesh with a gear 155 fixed to the lowest order drum 156 of a set of indicator drums. Accordingly, during normal operation, rotation of the drum 156 is effected by transmitting motion of the gear 50 to the gear 155, through the idler pinion 151.

The upper end of the lever 152 constitutes a follower portion 157 adapted normally to be received in a V-shaped notch 158 in a control cam 159 fixed to a shaft 160. Also fixed to the shaft 160 is a gear 161 arranged to mesh with a rack 162. The rack 162 is urged by means, such as a spring 163 to a normal position, as illustrated, but is movable manually in the opposite direction by means of a manual control element 164. As will be observed, when the manual element 164 is depressed, or moved to the right as viewed in FIG. 14, the shaft 160 and control cam 159 are rotated, causing the lever 152 to be displaced in a counterclockwise direction, disengaging the idler pinion 151 from the lowest order drum 156.

Also associated with the drum 156, as well as other drums of the set, is a generally heart-shaped cam 165 fixed to the drum and arranged to cooperate with a cam follower 166. The cooperation of the cam 165 and follower 166 is similar to that described in connection with FIGS. 9 and 10, although the contour of the cam and follower are slightly different. The follower 66 is pivoted on a shaft 177 and urged to pivot in a clockwise direction by means of a spring 168.

Figures 12, 15:
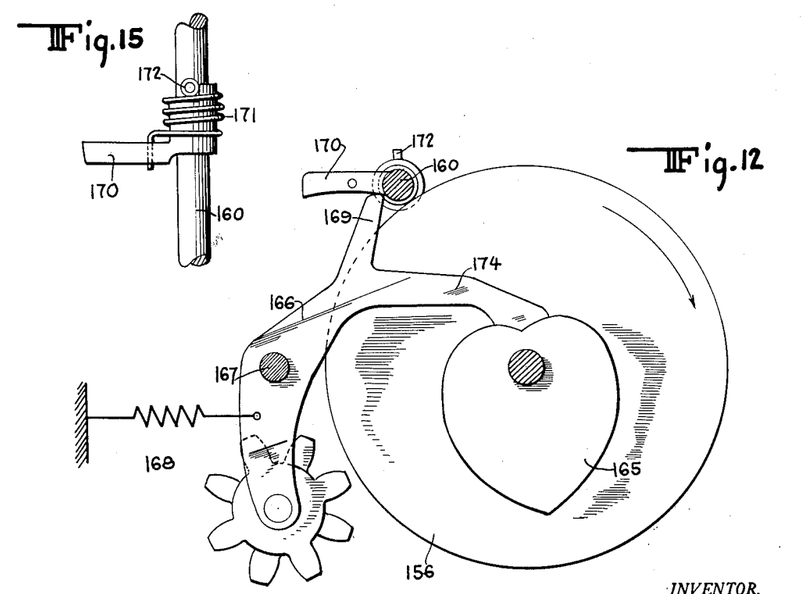
FIGS. 12–14 are enlarged, cross-sectional views of a modified form of reset means.
FIG. 15 is a fragmentary, plan view of a portion of the reset means of FIGS. 12–14.

In the specific modification of FIGS. 12–15, the follower 166 is provided with an upwardly extending arm 169 adapted, when the drum and follower are in the zero position, as illustrated in FIG. 12, to underlie a pawl 170 mounted on the control shaft 160. The pawl 170 is mounted for rotation on the shaft and is urged by a spring 171 to rotate in a counterclockwise direction, as viewed in FIG. 12, its rotation in such direction being limited, however, by a stop 172 fixed to the shaft 160.

When the mechanism is in the condition illustrated in FIG. 12, the arm 169 of the follower underlies the base of the pawl 70, adjacent the shaft 160, holding the pawl away from the stop 172, against the action of the spring 171. When the drum 156 is rotated, the follower 166 is caused to pivot counterclockwise about the shaft 167 and the arm 169 moves through an arc which causes the outer end of the pawl 170 to be raised slightly. As the drum approaches the five position, as illustrated in FIG. 13, the arm 169 of the follower clears the outer end of the pawl 170, causing the pawl to fall behind the arm and against an inclined surface 173 formed thereby. The tensioned spring 171 thereupon urges the pawl 170 to rotate counterclockwise until it engages the stop 172 and reaches the limit position shown in FIG. 13. The slight movement of the pawl 170 thus effected causes further counterclockwise movement of the follower 176, to provide a slight clearance between the end of the follower and the cam 165, and the follower is locked in the displaced position by the pawl.

As before described, the lower end of the follower 166 carries a transfer pinion 174, which is brought into operative position upon displacement of the follower to its maximum extent.

An action similar to that described, takes place in sequence for all the drums of the set, as will be understood. Each follower is fully displaced and locked in position during the rotation of the associated drum from its zero to its five position, so that the restraining force applied to the driving mechanism is never greater than that of a single follower.

To reset the drums to zero, after a delivery operation, the manual member 164 is depressed to rotate the shaft 160. This disengages the lowest order gear 166 from the drive system, as previously explained, and also causes the pawl 170 associated with each follower to be rotated out of locking engagement with the arm portion 169 of the follower. The followers thereupon act upon the cams 165 to return the respective drums to their zero position, substantially in the manner previously described. Advantageously, the relationship between the pawls 170 and the active portions 174 of the follower arms is such that, in the event of sluggish operation of the mechanism, the pawls 170 may rotate clockwise into engagement with the upper surfaces of the arm portions 174. By this means, the drums are forcibly returned, if necessary, to their zero positions.

Figure 16:
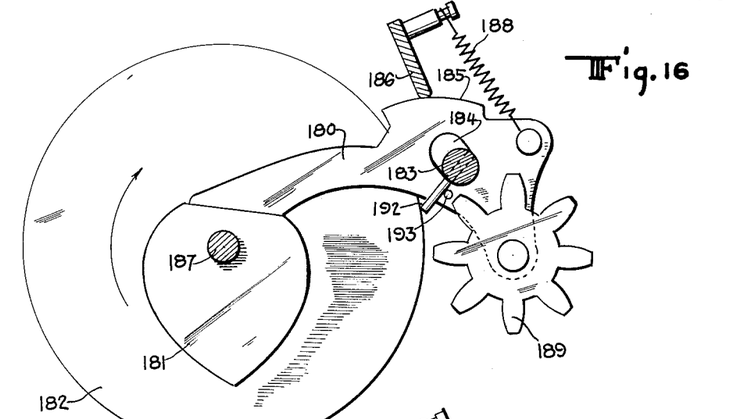
FIGS. 16–18 are sequential, cross-sectional views of a third form of resetting means adapted for use with the new indicator mechanism.
Figure 17:
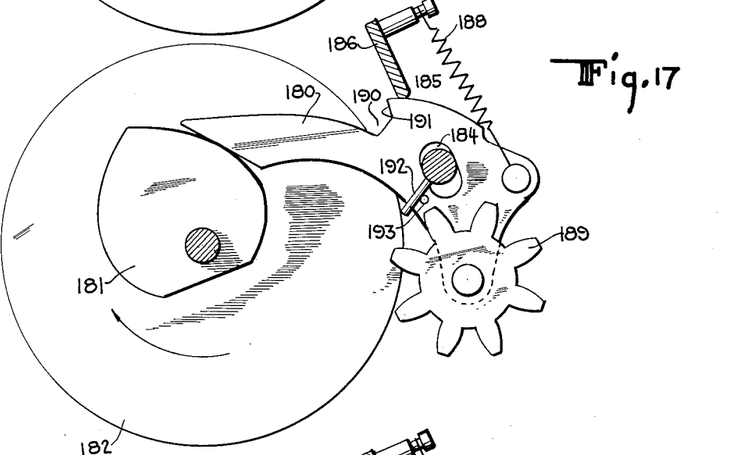
Figure 18:
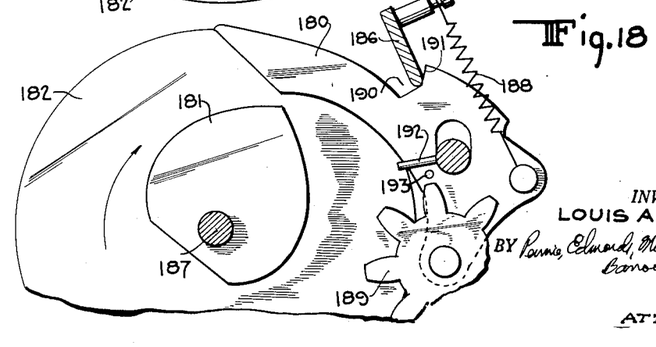

A still further modification of the resetting means is illustrated in FIGS. 16–18. There, a follower 180 cooperating with a generally heart-shaped cam 181 fixed to a drum 182 is supported by a control shaft 183 for rotary movement and limited movement in a direction transverse of the shaft, as determined by the length and direction of a slot 184 provided in the follower. The follower is provided along its upper edge with a curved cam surface 185 which cooperates with a fixed confining member or guide 186. Accordingly, when the drum 182 is rotated to displace the end of the follower away from the central shaft 187 of the drum mechanism, the follower is caused to pivot about the shaft 183 and simultaneously to move downward with respect to the shaft, in accordance with the orientation of the slot 184 and the contour of the cam surface 185. During such movement, a spring 186 is distended.

The relationship of the cam surface 185, the guide 186 and the slot 184 is so chosen that, when the end of the follower is displaced by the cam, the transfer pinion 189 carried at the end of the follower swings down into operative position in the manner before described.

As the drum 182, starting from its zero position, nears its five position, the cam surface 185 of the follower slides along the guide 186 and causes a notch 190 to pass the guide. When the notch is aligned with the guide, the spring 188 draws the follower upward, away from the cam and locks the follower in displaced position. In addition, a surface 191 forming one side of the notch 90 is disposed at such an angle as to form an inclined surface in conjunction with the guide 186, whereby, as the follower is retracted upwardly, it is pivoted slightly to clear the cam 181. Accordingly, during further rotations of the drum 182, there is no contact between the cam 181 and follower 180.

To reset the drum mechanism to zero, the shaft 183 is rotated counterclockwise to bring a pin 192 carried thereby into engagement with an abutment member 193 mounted on the follower 180. Continued rotation of the shaft 183 causes the follower 180 to be drawn downward, to disengage the notch 190 from the guide 186. Once the notch and guide are disengaged, the spring 188 causes the follower 180 to return along the path of movement followed during its displacement, the follower thereby acting upon the cam 181 to return the drum 182 to its zero position. In the event of sluggish operation of the mechanism positive force can be applied to the follower 180 by continuing the application of torque to the shaft 183, causing the pin 192 to bear against the abutment 193 to effect positive motion of the cam follower 180.

The new apparatus incorporates a number of advantageous features providing a greatly improved indicator mechanism for use in connection with gasoline dispensing installations, for example. Thus, the improved variable transmission mechanism and related components have been reduced greatly in size, enabling the entire mechanism to be housed conveniently within the generally rectangular area defined by the four sets of indicator drums. This is accomplished without any reduction in the diameter of the drums, which would tend to make the drums harder to read, and without any increase in the spacing between the drum axes, which would make the installation undesirably bulky. In addition, the simplified and highly compact transmission mechanism may be conveniently mounted in a unitary manner on a removable plate, enabling axial insertion of the mechanism into the housing containing the indicator drums. This is advantageous as it greatly simplifies the manufacture, as well as expedites maintenance and repair.

One of the specific advantageous features of the new variable transmission mechanism resides in the provision of cam plates or strips for controlling the position of output pinions meshing with a conical gear stack. In addition to being a substantially simplified and highly practical arrangement generally, the new structure permits the envelope of the conical gear stack to be varied whereby, as in the illustrated mechanism, a number of gears may be the same diameter.

Another advantageous feature of the invention resides in the provision of improved zero reset means for the indicator drums, which enable the drums to be returned to zero by the action of springs, following a delivery operation, but which are so constituted as to minimize the restraining force applied to the drive system during the tensioning of the springs. This is accomplished by arranging the resetting means so that, for each set of drums, only one return spring is tensioned at a time. The restraining force applied by the drum set thus never exceeds the restraining force required to tension a single spring. The mechanism is also arranged in a novel manner to provide for positive mechanical return of the drums to zero positions, in the event of sluggish operation of the mechanism, so that the drums may be turned to zero on all occasions prior to a delivery operation.

In one of the advantageous forms of the invention, the resetting of the indicator drum mechanisms is effected automatically upon removal of a delivery nozzle from a support therefor. Accordingly, when the nozzle is removed in preparation for a delivery operation, resetting of the indicator drums to zero takes place automatically. In addition, control means may be incorporated with the automatic resetting means in an advantageous manner, whereby full resetting of all indicator mechanisms to zero positions is assured before a delivery operation can be initiated.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. Liquid dispensing apparatus comprising a plurality of indicating drums forming a transfer counter, transfer means between adjacent of said drums effecting an incremental advance of the drum of higher order in each pair of adjacent drums for each revolution of the drum of lower order in such pair, drive means entrained by the liquid for rotating the drum of lowest order, and means to reset the drums to zero, said reset means comprising a separate cam mounted for rotation with each drum, a cam follower for each cam, return spring means acting individually on the followers and tending with the followers to rotate the cams and drums to zero position for the drums, the followers being displaced by their cams to distend said spring means during rotation of their respective drums away from zero position, separate movable locking means associated with each follower, each such locking means being moved by its follower, in response to motion of such follower on its cam during such rotation to a position of maximum displacement for such follower, to an operative position for such locking means in which its follower is retained in displaced position independently of its cam, and common means to withdraw all of said locking means from operative position.

2. The apparatus of claim 1, in which the transfer of movement from a lower order drum to a higher order drum is effected during the movement of the lower order drum from its nine position to its zero position, and the cams are countoured to move the respective followers to positions of maximum displacement during rotation of the respective drums from zero positions to points in advance of the initiation of transfer movement.

3. The apparatus of claim 2, in which the cams are symmetrically shaped and contoured to move the followers to positions of maximum displacement during rotation of the drums from zero positions to five positions.

4. The apparatus of claim 1, in which the transfer counter includes transfer gears for transferring movement from lower order drums to higher order drums, and the transfer gears are movable by the cam followers into and out of operative positions, the transfer gears being moved to operative positions by movement of the followers to positions of maximum displacement.

5. The apparatus of claim 4, in which the transfer gears are mounted on the cam followers for movement therewith.

6. The apparatus of claim 1, in which the locking means for each follower includes locking spring means operative when the follower is moved by its cam to a position of maximum displacement to retract the follower against the action of its return spring to a position clear of the path of the cam.

7. The apparatus of claim 6, in which the followers are mounted for independent pivoting movement by a shaft, and the locking spring means for each follower includes a spring actuated pawl positioned to cooperate with a cam surface on the follower, said cam surface and pawl being so related that, when the follower is displaced to a predetermined position by its cam, the pawl engages and acts upon said cam surface to retract the follower and lock it in retracted position.

8. The apparatus of claim 7, in which the respective pawls are mounted on a shaft for limited pivoting movement thereon, and the releasing means comprises means for rotating the shaft to move the pawls out of engagement with said cam surfaces.

9. The apparatus of claim 8, in which each follower has a second cam surface engageable by the respective pawl upon rotation of the pawl supporting shaft in a direction to disengage the pawls from the first cam surfaces, the second cam surfaces being so arranged with respect to the pawls that rotation of the pawls in said direction effects, if necessary, forcible return of the followers and cams to zero positions.

10. The apparatus of claim 6, in which each follower is mounted on a shaft for rotational movement and for movement transverse of the shaft, the follower is provided with a cam surface acted upon by a confining element fixed with respect to the shaft, the follower is provided with an elongated slot receiving the shaft which, together with the shaft, cam surface and confining element, confines the movement of the follower to a predetermined path.

11. The apparatus of claim 10, in which the cam surface has, at one end, a locking notch positioned to be aligned with the confining element when the follower is moved by its cam to a position of maximum displacement, and spring means act upon the follower when the notch and element are aligned to effect retracting movement of the follower and thereby cause the confining element to be received in the notch.

12. The apparatus of claim 10, in which the releasing means includes means to rotate the follower supporting shaft.

13. The apparatus of claim 11, in which the releasing means includes means to rotate the follower supporting shaft, and interengaging means on the shaft and the respective followers adapted, upon initial rotation of the shaft, to cause the notch to be drawn away from the confining element and upon continued rotation of the shaft, to cause forcible movement of the follower, if necessary, to effect full return of the drum to its zero position.

14. The apparatus of claim 1, in which the drum of the lowest order is driven by an input pinion, the input pinion is mounted for movement into and out of driving engagement with the drum, and the releasing means includes means for moving the input pinion out of driving engagement.

15. The apparatus of claim 1, for use in combination with a liquid dispensing installation having a dispensing nozzle and a hanger for supporting the nozzle when not in use, in which the hanger comprises a lever pivoted in one direction by the weight of the nozzle, spring means for moving the lever in the other direction, and means actuated upon movement of the lever in said other direction for effecting release of the followers.

16. The apparatus of claim 15, in which the release means includes a rack driven by the lever, a crank wheel driven by the rack and rotatable through a full revolution by movement of the rack, a shaft operative when rotated through a partial revolution to effect release of followers, and linkage means connecting the crank wheel and shaft for rocking the shaft upon rotation of the crank wheel.

17. The apparatus of claim 16, which includes a switch operative when actuated to condition the apparatus for delivery, means on the rack for actuating the switch upon full movement of the rack in a releasing direction, and means actuated by movement of the rack in said direction for effecting, if necessary, positive return of the cams and followers to zero positions.

References Cited in the file of this patent

UNITED STATES PATENTS

| | | |
|---|---|---|
| 1,409,547 | Hosch | Mar. 14, 1922 |
| 2,106,807 | Locke et al. | Feb. 1, 1938 |
| 2,320,091 | Loder | May 25, 1943 |
| 2,322,767 | McLaren | June 29, 1943 |
| 2,563,668 | Abel | Aug. 7, 1951 |
| 2,599,556 | Jacobs | June 10, 1952 |
| 2,739,736 | Bliss | Mar. 27, 1956 |

FOREIGN PATENTS

| | | |
|---|---|---|
| 610,472 | Great Britain | Oct. 15, 1948 |
| 775,122 | France | Dec. 20, 1934 |